(12) United States Patent
Austin (10) Patent No.: US 9,213,873 B2
(45) Date of Patent: Dec. 15, 2015

(54) DETERMINING MOVEMENT OF A RADIO FREQUENCY IDENTIFICATION TAG USING A PHASE DIFFERENCE/FREQUENCY MODEL

(71) Applicant: Symbol Technologies, Inc., Schaumburg, IL (US)

(72) Inventor: Timothy B. Austin, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 267 days.

(21) Appl. No.: 13/849,048

(22) Filed: Mar. 22, 2013

(65) Prior Publication Data
US 2014/0285324 A1 Sep. 25, 2014

(51) Int. Cl.
*H04Q 5/22* (2006.01)
*G06K 7/00* (2006.01)
*G08C 19/16* (2006.01)
*G06F 17/00* (2006.01)
*G06K 7/10* (2006.01)
*G01S 13/84* (2006.01)

(52) U.S. Cl.
CPC ............. *G06K 7/10108* (2013.01); *G01S 13/84* (2013.01)

(58) Field of Classification Search
CPC .................................. H04Q 5/22; G06K 7/00
USPC ........ 340/10.1–10.5, 572.1, 539.13; 342/127; 235/375
See application file for complete search history.

(56) References Cited

U.S. PATENT DOCUMENTS

| | | | | |
|---|---|---|---|---|
| 7,030,761 | B2 * | 4/2006 | Bridgelall et al. | 340/572.2 |
| 7,574,732 | B2 * | 8/2009 | Knox et al. | 726/3 |
| 8,120,488 | B2 * | 2/2012 | Bloy | 340/572.1 |
| 8,237,563 | B2 * | 8/2012 | Schatz | G06K 7/0008 340/10.1 |
| 8,248,210 | B2 * | 8/2012 | Nikitin | G01S 5/0247 340/10.1 |
| 8,279,112 | B2 * | 10/2012 | Carrick | 340/10.1 |
| 8,493,182 | B2 * | 7/2013 | Hofer et al. | 340/10.1 |
| 8,497,776 | B2 * | 7/2013 | Stern | G08B 13/2402 235/385 |
| 8,537,014 | B2 * | 9/2013 | Broer | 340/572.1 |
| 8,681,005 | B2 * | 3/2014 | Austin et al. | 340/572.4 |

(Continued)

FOREIGN PATENT DOCUMENTS

WO 2009151778 A2 12/2009
WO 2011135328 A2 11/2011

OTHER PUBLICATIONS

"Phase Based Spatial Identification of UHF RFID Tags" by Pavel et al. dated Apr. 14-16, 2010; pp. 102-109.

*Primary Examiner* — Nam V Nguyen (57) ABSTRACT

Determining movement of a Radio Frequency Identification (RFID) tag first establishes a phase difference/frequency model comprising a set of phase-wrapped local rates-of-change and an intercept point. RFID tag readings are then made to measure phase differences between the interrogation signal and the tag response at different frequencies. A correlation is determined between the measured phase differences versus frequency and the phase-wrapped local phase rates-of-change of the phase difference/frequency model. If the correlation is better than or equal to a predetermined limit, the tag is stationary, or if the correlation is worse than the predetermined limit, the tag is moving.

14 Claims, 10 Drawing Sheets

(56) References Cited

U.S. PATENT DOCUMENTS

| | | |
|---|---|---|
| 2004/0203846 A1 | 10/2004 | Caronni et al. |
| 2005/0190098 A1 | 9/2005 | Bridgelall et al. |
| 2006/0044147 A1* | 3/2006 | Knox et al. ............... 340/686.1 |
| 2009/0207024 A1* | 8/2009 | Schatz et al. ............. 340/572.1 |
| 2009/0303004 A1 | 12/2009 | Tuttle |
| 2010/0328073 A1* | 12/2010 | Nikitin et al. ............. 340/572.1 |
| 2011/0187600 A1* | 8/2011 | Landt ........................ 342/458 |
| 2012/0161931 A1* | 6/2012 | Karmakar et al. .......... 340/10.1 |
| 2013/0201003 A1* | 8/2013 | Sabesan et al. ............. 340/10.1 |
| 2014/0015546 A1* | 1/2014 | Frederick .................... 324/642 |
| 2014/0167920 A1* | 6/2014 | Kamiya ...................... 340/10.1 |

* cited by examiner

DETERMINING MOVEMENT OF A RADIO FREQUENCY IDENTIFICATION TAG USING A PHASE DIFFERENCE/FREQUENCY MODEL

BACKGROUND

Radio Frequency Identification (RFID) inventory management systems have become common in commercial environments, such as a retail store for example. In a typical scenario, an RFID tag is affixed to an identified object, and an RFID reader is used to read nearby tags, thereby locating particular objects affixed with the tag within the vicinity of the reader, for inventorying purposes. The RFID reader can be activated manually or automatically in a periodic fashion. Of course, in the retail scenario presented herein, objects are constantly being moved about, and it would be difficult to accurately monitor the movement of tagged objects, unless all readers are operated constantly. However, constant operation of all readers will not only cause severe signal interference problems, but also a power drain problem for battery-powered readers (and those tags equipped with batteries).

Therefore, for inventory management purposes, it is desired to determine whether a tag is moving or stationary, using RFID reads that are limited to operate only occasionally. Of course, the task of managing the location of a stationary tagged object is trivial. Therefore, a technique to separating moving tags from stationary RFID tags within a read zone is needed for tag management and tag tracking and locationing.

One technique to determine tag movement is to detect a change in distance of the tag. This is accomplished by having an array of many different readers transmit at different frequencies to a tag, measure the phase of the many backscatter modulated signals from the tag, and determine a rate of change of the phase in the backscatter modulated signals with respect to the rate of change in the fundamental frequency of the transmitted signals. However, this technique, although an improvement in the art, uses many signals and measurements, and may be less useful where rapid decision making is required, particularly when tags are a long distance (more than twenty-five feet) from a reader, because the tag may only be read a few times on a limited number of channels while it is within the read zone. Also, in a multipath environment, such as a retail environment with multiple RF reflecting surfaces, the relationship between phase difference and frequency often varies across the RFID spectrum, particularly as distance between a tag and reader is large.

Accordingly, there is a need for a technique for determining whether a tag is moving or stationary in an environment. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that provides a technique to decide on whether a RFID tag is moving or stationary to be made based on relatively few new reads of the tag with a sparse historic data set. The present invention works well in a multipath environment with long distances between the reader and tag. The present invention determines motion purely by finding that there is no linear relationship between phase differences between a few local measurements (in addition to finding a change in this relationship). In other words, the present invention can detect motion when it occurs during a reading and when it occurs between two sets of static readings.

Generally, the present invention provides a system and method for determining movement of objects using Radio Frequency Identification (RFID) tags. The system and method uses the phase of backscatter modulated signals from the RFID tags with respect to the fundamental frequency of the transmitted signals to efficiently and accurately determine the movement of objects.

RFID is a technology that incorporates the use of electromagnetic or electrostatic coupling in the radio frequency spectrum to identify objects to which RFID tags are affixed. RFID systems in general provide the advantage of not requiring direct contact or line-of-sight scanning. A typical RFID system includes an RFID reader and a plurality of RFID tags that are affixed to the objects of interest. The RFID reader includes an antenna and also includes or is coupled to a transceiver. The RFID reader uses the antenna and transceiver to transmit radio frequency signals to the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag.

Thus, an RFID reader can be used to select one or more RFID tags and retrieve data from the selected tags. As such, RFID tags can be used to identify and track large numbers of objects. Furthermore, because RFID tags have a relatively low per-unit cost, they have the ability to track large numbers of objects at relatively low costs.

RFID tags are used in a variety of commercial contexts that require a unique identification system for large numbers of items. As an example, RFID tags are used in everything from department store inventory and checkout systems to the tracking of warehouse supplies. RFID systems are often preferred for object identification due to their increased range, lack of a line of sight requirement between a tag and its reader, and high multi-tag throughput.

RFID tags are available in a variety of configurations, shapes and sizes. For example, different tags for different applications typically have a shape and size appropriate for its application. RFID tags are commonly categorized as active, passive or semi-passive. Active RFID tags include an internal battery used to transmit data and typically include the ability to read and write greater amounts of stored data than either passive or semi-passive tags. Passive RFID tags transmit by reflecting and absorbing energy from the RF transmissions from the reader, and use absorbed energy from the reader for data storage, retrieval, and manipulation. Semi-passive tags include an internal battery that is used for data storage, retrieval, and manipulation, while transmitting data by reflecting and absorbing energy from the reader.

Passive and semi-passive tags are typically lighter and less expensive than active tags. Passive tags offer a virtually unlimited operational lifetime because they do not require a battery for operation. The trade off is that they typically have a shorter read range than active tags, and require a higher output power from the reader. It is important to note that governmental restrictions in many jurisdictions restrict reader output power to ensure safety and to minimize interference between devices that must share frequency bands.

Passive and semi-passive tags include both read-only tags that are programmable once with a unique set of data that cannot be later modified, and read/writeable tags that can be rewritten one or more times using a suitable RFID writing device.

RFID systems can use a variety of techniques to transmit data to and from the tag. For transmission to the tag, the data can be transmitted using any of a variety of modulation techniques, including amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM) and amplitude shift keying (ASK).

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero'). As another example, the data can be encoded using ASK, where the tag absorb-reflects at one rate for some duration to represent a first state (e.g., "one") and ceases back scatter modulation for another duration to represent a second state (e.g., "zero'). RFID systems also typically use a variety of different frequency ranges, including 30 KHz-500 KHz, 850 MHz-950 MHz and 2.4 GHz-2.5 GHz, depending on the regulatory spectrum allocations and performance requirements matched to various application requirements. For example, lower frequency systems typically provide better electromagnetic penetration through water while higher frequency systems do not. Lower frequency passive systems commonly operate within a few inches with small reader antennas while higher frequency systems commonly operate within several feet with similarly sized antennas. Also, lower frequency regulatory allocations are generally more widespread worldwide and typically allow more output power for passive tags than do higher frequency systems. However, where higher frequency spectrum is available for RFID, such as within Federal Communications Commission (FCC) regulated domains, the output power is substantial and allows for robust long-range performance.

The system described herein uses a wireless RFID air interface for communication with electronic RFID tags that may be affixed to, or embedded within, various different physical items, as is known in the art, and is used in the implementation of various embodiments of the present invention. RFID readers and RFID tags are known to refer to a wide variety of business electronic platforms and can include other devices and functions, as are known in the art and therefore not shown for the sake of simplicity.

The system described herein can also include a wireless local area communication network, such as the various IEEE 802.11 wireless communication systems. However, it should be recognized that the present invention is also applicable to other wireless communication systems modified to implement embodiments of the present invention. It should be recognized that the wireless communication network can include many other network entities to provide communication services, but these known entities are not shown to simplify the drawings. Also, the protocols and messaging needed to establish a wireless communication network are known in the art and will not be presented here for the sake of brevity.

Various entities are adapted to support the inventive concepts of the embodiments of the present invention. Those skilled in the art will recognize that the figures do not depict all of the equipment necessary for network to operate but only those network components and logical entities particularly relevant to the description of embodiments herein. For example, components such as processors, communication interfaces, transceivers, RFID scanners, power supplies, memories, and RFID tags are well-known, and will not be described in detail herein for the sake of brevity. It should be recognized that processing units are known to comprise basic components such as, but not limited to, microprocessors, microcontrollers, memory, application-specific integrated circuits, and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. It is within the contemplation of the invention that the operating requirements of the present invention can be implemented in a software processor (or a digital signal processor) in conjunction with firmware or hardware.

Figure 1:
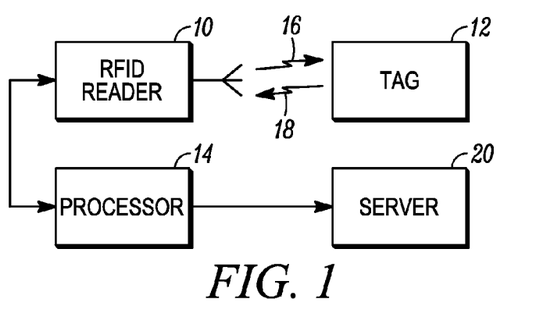
FIG. 1 is a simplified block diagram depiction of an RFID system, in accordance some embodiments of the present invention.

FIG. 1 is a block diagram depiction of a system to determine the movement of a radio frequency identification (RFID) tag 12, in accordance with the present invention. A radio frequency identification (RFID) reader 10 is provided having one or more antennas, and is operable to send out interrogation signals 16 to an addressed RFID tag within it range. Addressing the RFID tag uses a tag identification to select one RFID tag among potentially thousands of others. Addressing puts the selected RFID tag into a responsive mode where it will modulate and backscatter received signals from the reader. Tags that are not selected will typically go into a muted state, where their reflections are intentionally minimized. The addressed RFID tag can then respond to the interrogation signals with a backscattered modulated response 18. As is known in the art, the reader uses a frequency hop schedule to send each of its interrogation signals at different frequencies across defined ISM bands. Whatever frequency is used to send an interrogation signal, the tag will respond at the same frequency, but with a time delay due to the distance between the tag and reader and, the speed of light, and possibly a processing time for processing of the signals in both the tag and reader.

Figure 2:
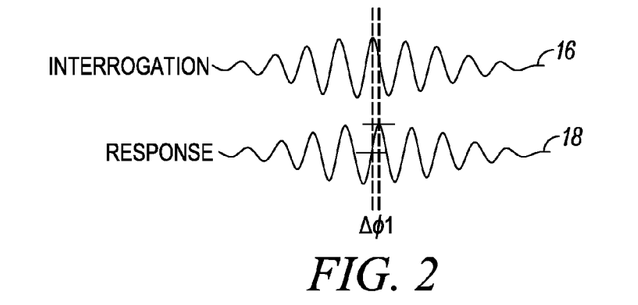
FIGS. 2-4 are graphical representations of a phase difference measurements, in accordance with some embodiments of the present invention.
Figure 3:
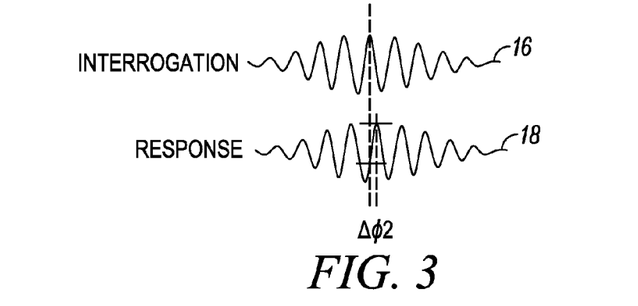
Figure 4:
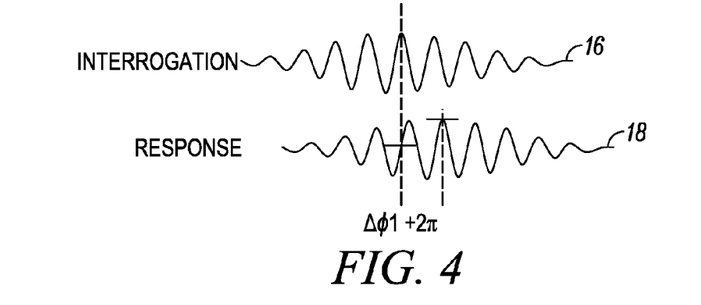

FIG. 2 shows that the time delay from when the interrogation signal 16 is sent from the reader and when the reader receives the backscattered modulated response 18 from the tag produces a measurable phase difference, Δ1. The phase difference is dependent on the frequency being used. For example, FIG. 3 shows a reader using a higher frequency signal/response. Although the time delay is the same a higher phase difference, Δ2, is produced due to the shorter cycle period. Of course, the farther that the tag is away from the reader the more phase difference is produced, and if the tag is far enough away, the phase difference may wrap around itself, i.e. the phase difference is greater than 2π. For example, in FIG. 4 a measured phase difference is actually Δ1+2π which is equivalent to Δ1 in the reader, as in FIG. 1. Prior art distance locationing systems are concerned with each extra 2π of phase wraparound, which needs to be unwrapped to obtain a total phase change. However, the present invention is only concerned with detecting a movement of a tag (and the object it is affixed to) and not its distance or location. Therefore, phase differences need not be unwrapped, as will be detailed below.

Referring back to FIG. 1, the actual processing to determine the phase difference between sending the interrogation signal and receiving the response is performed in a processor 14, which could be implemented in variety of ways. For example, the processor can be fully implemented as part of each RFID reader. In another implementation, the processor can be implemented at a central location, with the phase and fundamental frequency data used to calculate the phase difference versus frequency to a central server 20 using any suitable wired or wireless networking technology. Finally, the processor can be implemented partially in the reader, and partially at a remote processor or central server. For example, the time delay and frequency can be determined at each reader, with the final phase difference calculations made at remote processor or central server linked to the readers. Therefore, as used herein, the term "processor" means any of these local or distributed processing devices for determining phase difference versus frequency.

Figure 5:
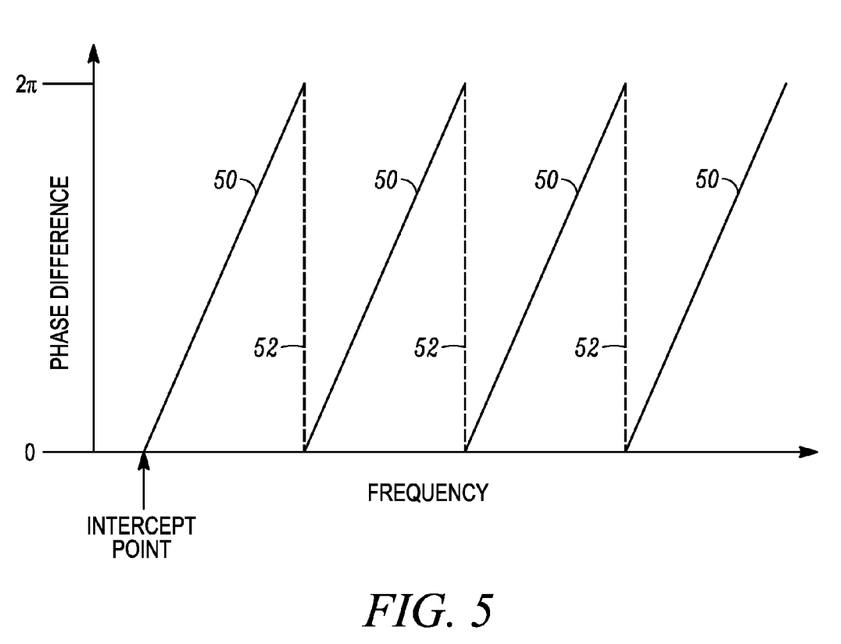
FIG. 5 is a graphical representation of a phase difference/frequency model, in accordance with some embodiments of the present invention.

The present invention determines movement of an RFID tag within an environment by first establishing a wrapped phase difference/frequency model comprising a set of phase-wrapped local rates-of-change and an intercept point, as shown in FIG. 5. When a stationary tag is read by a reader, there is a fixed time delay between sending the interrogation signal and the receiving the response, as explained above. The time delay produces different phase differences at different frequencies, also as explained above. Therefore, as shown, a fixed time delay at higher frequencies produce greater phase difference measurements, resulting in a sloped line 50. Any phase difference above a multiple of 2π results in a wrap around 52 of the sloped line 50. It should be noted that an intercept point of the line may not begin at zero, due to variations in the phase difference/frequency relationship inherent in the multipath environment over large changes in frequency. As a result, the model of phase difference versus frequency results in a set of phase-wrapped local rates-of-change (i.e. each line 50) and an intercept point. The term "local" as used herein describes phase measurements taken among a grouping of neighbor frequencies. The model can be determined empirically in the environment of use, and the present invention provides different technique to establish the model, as will be detailed below.

Once the model is defined for the environment, the present invention starts measuring tags to determine if they are moving or stationary. In particular, an RFID reader periodically transmits at least one interrogation signal to an RFID tag using at least one respective frequency, and receives at least one respective backscattered modulated response from the RFID tag at the at least one respective frequency. In practice, the RFID reader sends many interrogations at different scheduled hop frequencies, and receives a response from the tag for each of these frequencies, although the present invention is operable for only one measurement. Multiple measurements serve to confirm a determination of whether a tag is moving or not.

Figure 6:
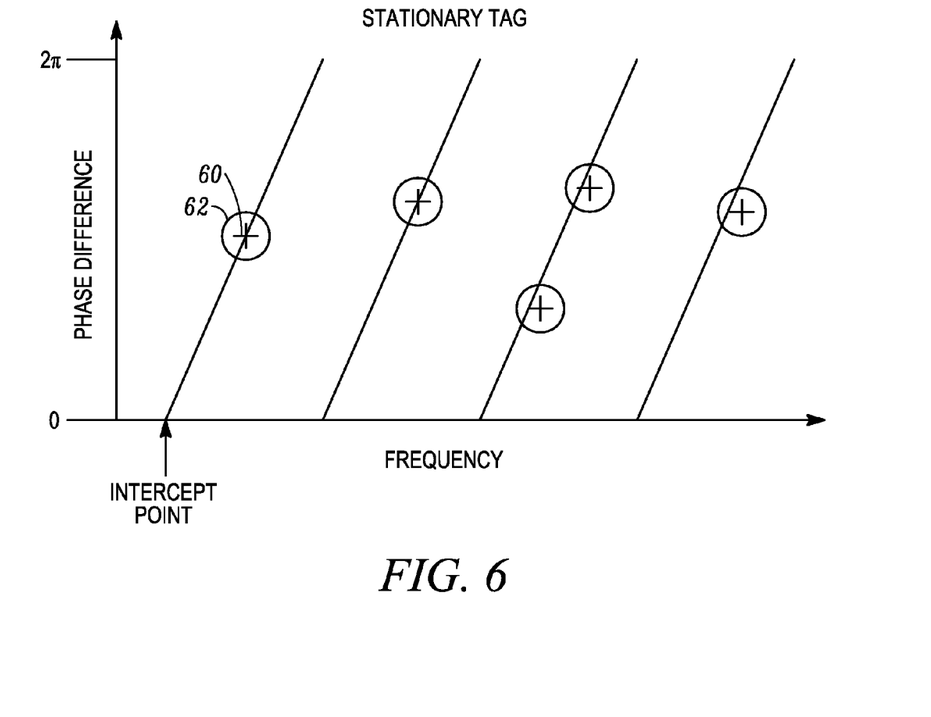
FIG. 6 is a graphical representation of a phase difference measurement in comparison to the model of FIG. 5, indicating a stationary tag.

The processor measures a phase difference between the at least one signal and the at least one respective response at the at least one respective frequency, and determines a correlation of the measured phase difference at the at least one respective frequency to the phase-wrapped local phase rates-of-change of the phase difference/frequency model. In particular if the measurement(s) match the model the tag is determined to be stationary, and if the measurement(s) do not match the model the tag is determined to be moving For example, in FIG. 6, phase difference measurements 60 have been taken of signals/responses at five different frequencies. The processor determines a correlation of the measured phase differences at each respective frequency to the model. If the correlation is better than or equal to a predetermined limit 62, the processor sends an indication to the server that the tag is stationary. In this case as shown, each measurement 60 matches the model to within the limit 62. The limit can be determined empirically for the particular embodiment. For example, multipath reflections of the signal/response may introduce minor errors that can be accommodated by the limit. It may be that one or more of the measurements are greater than the limit, and then a decision can be made by the processor or the server as to whether the determination of "stationary" is valid or not, and whether to accept the measurements or discard and repeat them.

Figure 7:
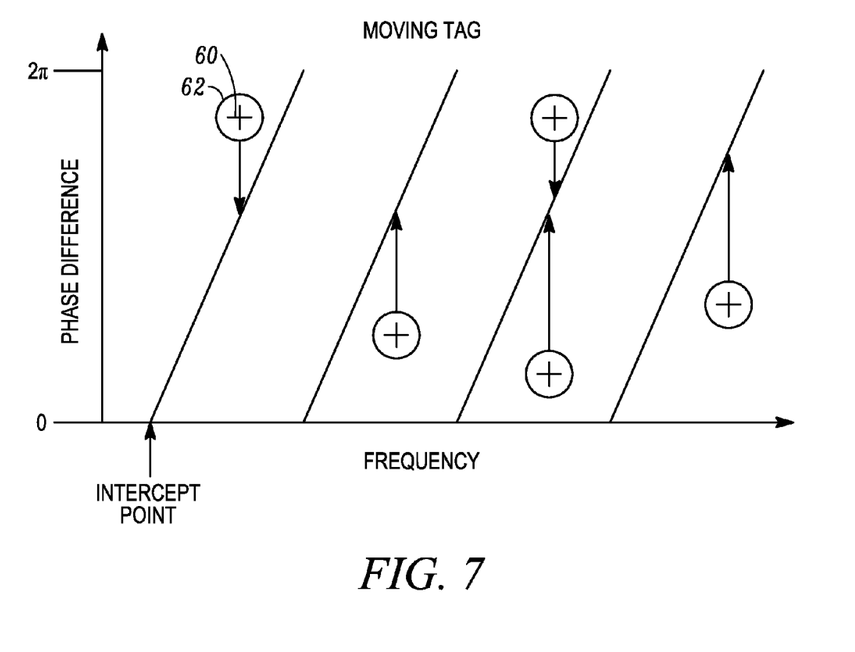
FIG. 7 is a graphical representation of a phase difference measurement in comparison to the model of FIG. 5, indicating a moving tag.

In the example of FIG. 7, the phase difference measurements 60 of the five signals/responses at different frequencies produce different results. In particular, a moving tag will produce a shifting time delay between sending the signal and receiving the response. In this case, the processor again determines a correlation of the measured phase differences at each respective frequency to the model, and finds that the correlation is worse than the predetermined limit 62, whereupon the processor sends an indication to the server that the tag is moving. It may be that one or more of the measurements meet the limit, and then a decision can be made by the processor or the server as to whether the determination of "moving" is valid or not, and whether to accept the measurements or discard and repeat them. Alternatively, if the correlation is greater than the predetermined limit, the tag can be read for at least one more measurement to determine if the at least one more correlation is greater than the error limit, confirming that the tag is moving.

Advantageously, the present invention can determine that a tag is moving while it is moving or even after it stops moving. In particular, if the tag is moving each measurement will be shifted while the tag is moving, and if the tags movement is started and completely stopped between measurements, which is unlikely, and it is not stopped in a position that is an exact phase multiple of $2\pi$ away between measurements, which is further unlikely, then the tag must have been moved.

In an optional embodiment, the processor can store phase differences for particular frequencies for an indicated stationary tag to create a history, and use the history to modify the model to increase its accuracy. However, this should be done for only those tags that have been confirmed as being stationary. If a tag is indicated as moving, the history for that tag should be discarded, since it would distort the model, and a new history started when the tag becomes stationary again. The history can be stored anywhere in the system, such as in the central server.

In another optional embodiment, if a tag is indicated as moving, the RFID reader reduces a period of the interrogation transmissions, and if a tag is indicated as stationary the RFID reader increases the period of the interrogation transmissions. In this way the movement of the tag can be tracked better, while those tags that are stationary need not be measured that often, thereby saving communication overhead and reducing the possibility of interference.

Figure 8:
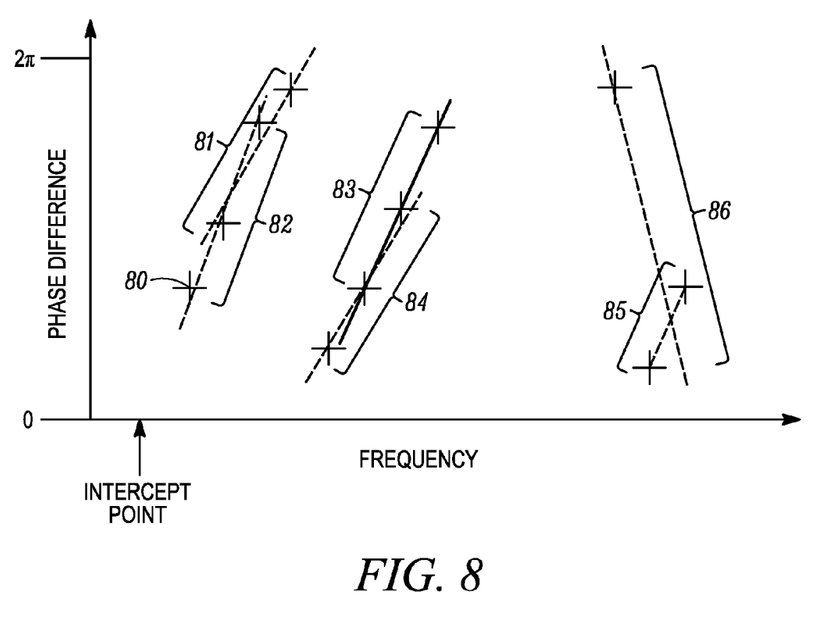
FIG. 8 is a graphical representation of a technique to establish the model of FIG. 5, in accordance with one embodiment of the present invention.

There are different ways that the present invention can establish the initial phase difference/frequency model. In one technique, phase difference/frequency measurements are made at different frequencies and these measurement points are used to derive the model. In particular, the RFID reader transmits a plurality of interrogation signals at different hop frequencies to the RFID tag, and receives respective backscatter modulated responses from the RFID tag. The processor measures a phase difference between each of the interrogation signals and the respective backscatter modulated responses versus frequency and determines a plurality of local phase rates-of-change of the phase differences for different groups of neighboring frequencies as shown in FIG. 8. For example, a group of neighboring frequencies can be the nearest two, three, or four frequencies 80. In one group the three lowest frequencies produce a local phase rate-of-change (i.e. slope) 82. A grouping of the second through fourth lowest produces a different local phase rate-of-change 81. A grouping of the fifth through seventh frequencies produces another local phase rate-of-change 84. A grouping of the sixth through eighth frequencies produces another local phase rate-of-change 83. A grouping of the highest three frequencies produces another local phase rate-of-change 86. A grouping of the highest two frequencies produces another local phase rate-of-change 85. It should be noticed that any particular chosen grouping may include measurements that are not within the same phase wrap, i.e. group 86, which produces a slope unlike the others with a poor linear dependence. What is desired is a grouping of linear measurements that will provide a good correlation.

The processor then provides a correlation of the measured phase differences for each group of neighboring frequencies with each respective local phase rate-of-change, such as using a Pearson correlation technique, as is known in the art, or any other suitable linear correlation technique. It is known that the slope of each local group should be within a suitable threshold. If the correlation is poor (i.e. a low Pearson product worse than the threshold), such as with group 86 that has non-linear measurements in different phase wraps, or if there is a non-linear outlier measurement within a phase wrap that skews the slope too much, or if there is a large standard deviation in slopes indicating a moving tag, those local phase rates-of-change are discarded (i.e. filtered out). In this example, group 86 is discarded. A correlation being higher than the threshold signifies that the phase differences are substantially linear along the local phase rates-of-change and the local phase rates-of-change should be included towards calculating an average or median rate-of-change.

The processor then calculates an average or a median phase rate-of-change of the local phase rates-of-change, to reduce the influence of outliers. In this case the median slope 83 is chosen as the slope for the set of phase-wrapped median phase rates-of-change to create the phase difference/frequency model, such as that of FIG. 5. As the phase wraps the intercept point of the median slope is used to create a reference model.

Figure 9:
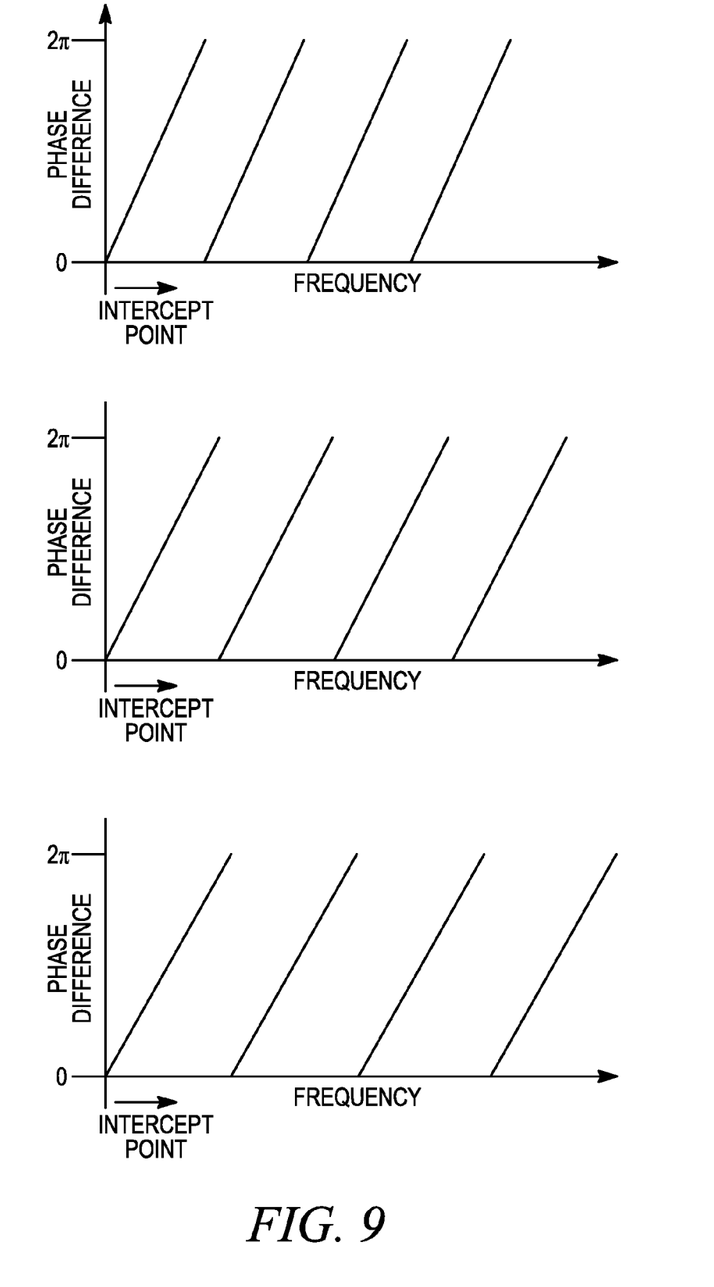
FIGS. 9-10 are a graphical representation of another technique to establish the model of FIG. 5, in accordance with another embodiment of the present invention.
Figure 10:
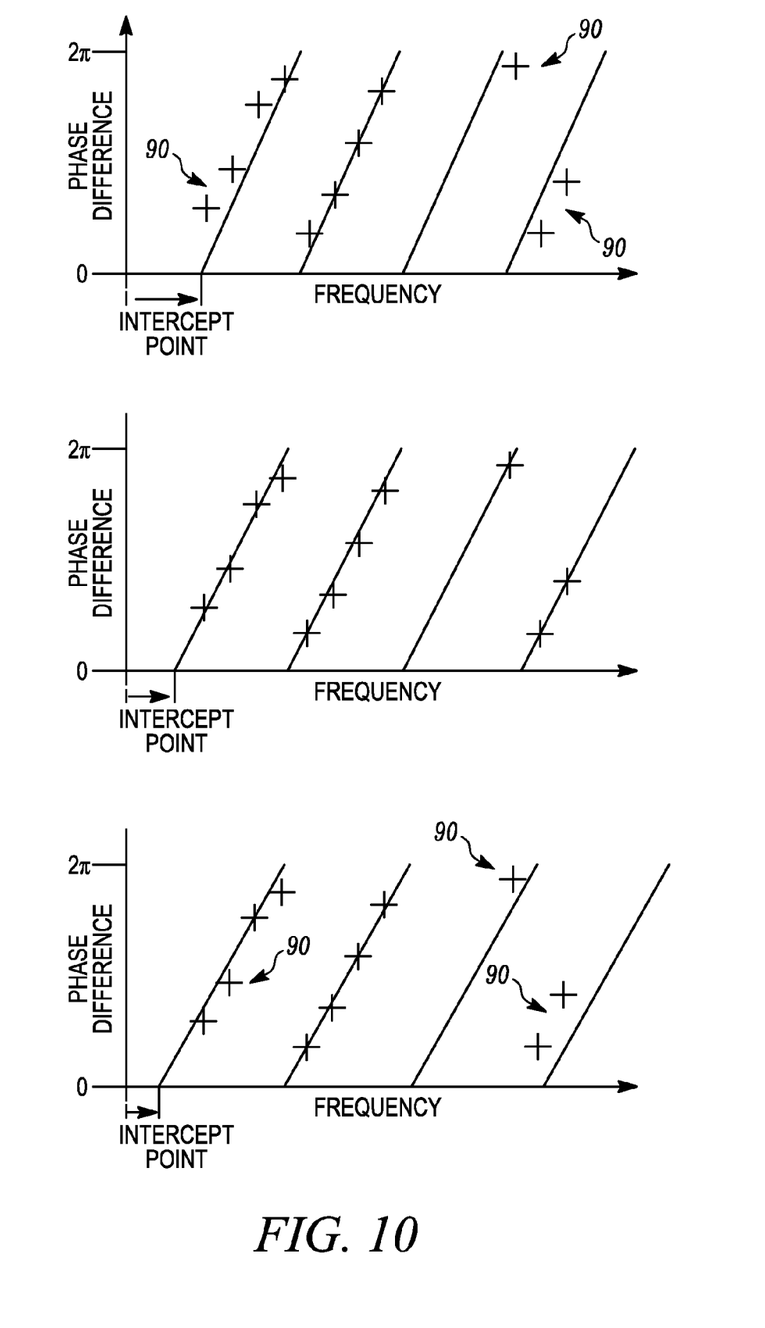

In another technique to establish the initial phase difference/frequency model, the processor generates a plurality of different sets of phase-wrapped local phase rates-of-change, each set using a different phase rates-of-change, as shown in FIG. 9. Each of the three models shown has a different local phase rates-of-change (i.e. slope). Although three models are shown any number of models could be used. The RFID reader then transmits a plurality of interrogation signals at different hop frequencies to the RFID tag, and receives respective backscatter modulated responses from the RFID tag. The processor measures a phase difference between each of the interrogation signals and the respective backscatter modulated responses versus frequency to obtain the measurement. The same set of measurements is then cross-correlated with each of the models, as shown in FIG. 10.

The processor performs a cross-correlation of the measured data against each of the different reference phase difference/frequency models. The cross-correlation drags the intercept point of each set of slopes to provide a best correlation, thereby accommodating any frequency lag between the measured data and reference models in the frequency domain; this technique is also known as the sliding dot product technique. The processor then selects the reference phase difference/frequency model that has the best correlation to the measured data and uses the frequency lag and slope to create a reference model for future checks of movement. Poor correlation with any of the models indicates that the tag is already moving. In this example, several measurements 90 do not correlate well with the upper and lower model. Therefore, the middle model shown is selected as the wrapped phase difference/frequency model to be used, such as that of FIG. 5.

Figure 11:
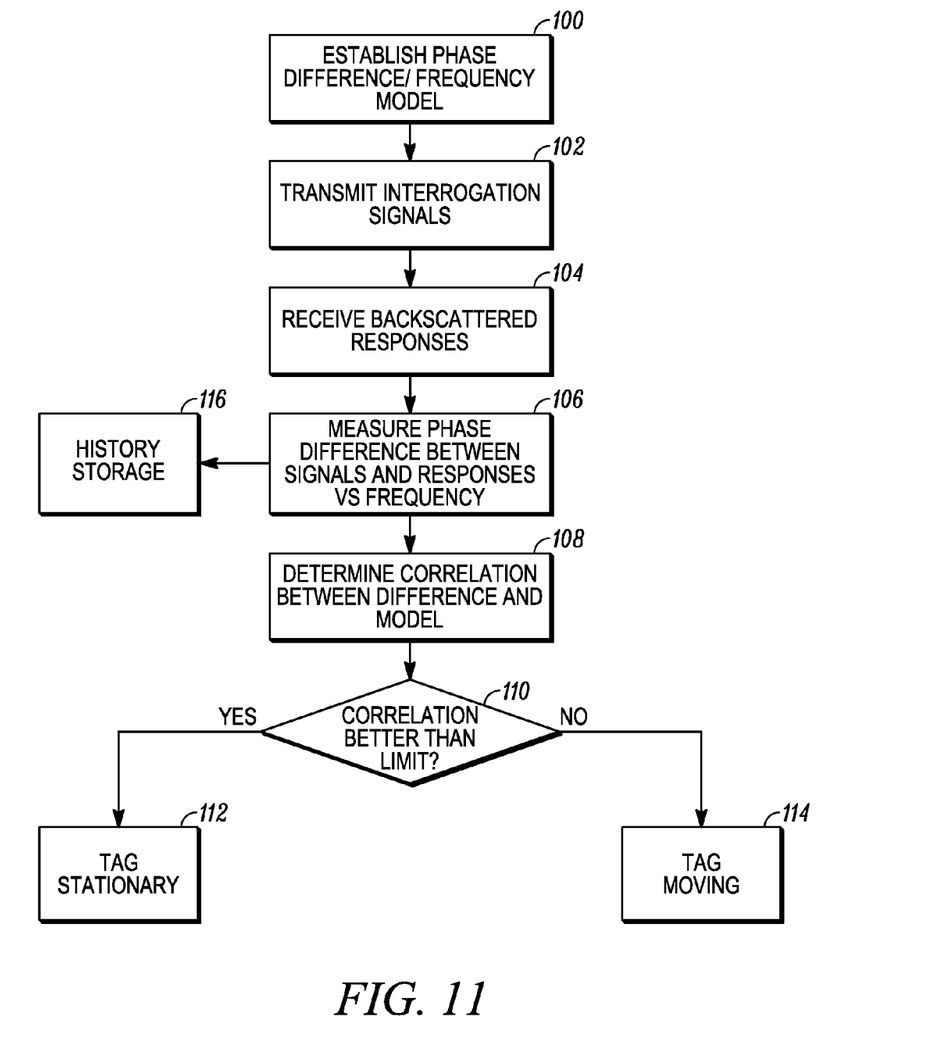
FIG. 11 is a flowchart of a method, in accordance with some embodiments of the present invention.

FIG. 11 describes a method for an apparatus to determine movement of an RFID tag, in accordance with the present invention. A first step 100, establishes a wrapped phase difference/frequency model comprising a set of phase-wrapped local phase rates-of-change and an intercept point. Different techniques for establishing the model will be described below.

A next step 102 includes periodically transmitting, by an RFID reader, at least one interrogation signal to an RFID tag using at least one respective frequency. The signal is sent at a "fundamental frequency" that can be the frequency of the carrier signal without harmonics. It should be noted that the transmitted signal is not necessarily purely sinusoidal and thus may in fact carry harmonics due to the need for pulse shaping at the receivers.

A next step 104 includes receiving at least one respective backscattered modulated response from the RFID tag at the at least one respective frequency.

A next step 106 includes measuring a phase difference between the at least one signal and the at least one respective response at the at least one respective frequency. Optionally, a step can be performed for storing 116 phase differences for particular frequencies for an indicated stationary tag to create a history, and use the history for modifying the model. In this case, if a tag is indicated as moving, discarding the history for that tag.

The next step 108 is determining a correlation of the measured phase difference at the at least one respective frequency to the phase-wrapped local phase rates-of-change of the phase difference/frequency model.

The next step 110 is determining if the correlation is better than, equal to, or worse than a predetermined limit.

If the correlation is better than or equal to a predetermined limit, sending 112 an indication that the tag is stationary, by the processor to the server, for display on a monitor for example.

If the correlation is worse than the predetermined limit, sending 114 an indication that the tag is moving, by the processor to the server, for display on a monitor for example. Optionally, if a tag is indicated as moving, the method can reduce a period of the interrogation transmissions, and if a tag is indicated as stationary, can increase the period of the interrogation transmissions. Further, if the correlation is worse than the predetermined limit, the method can read the tag for at least one more measurement to determine if the at least one more correlation is worse than the error limit, confirming that the tag is moving.

Figure 12:
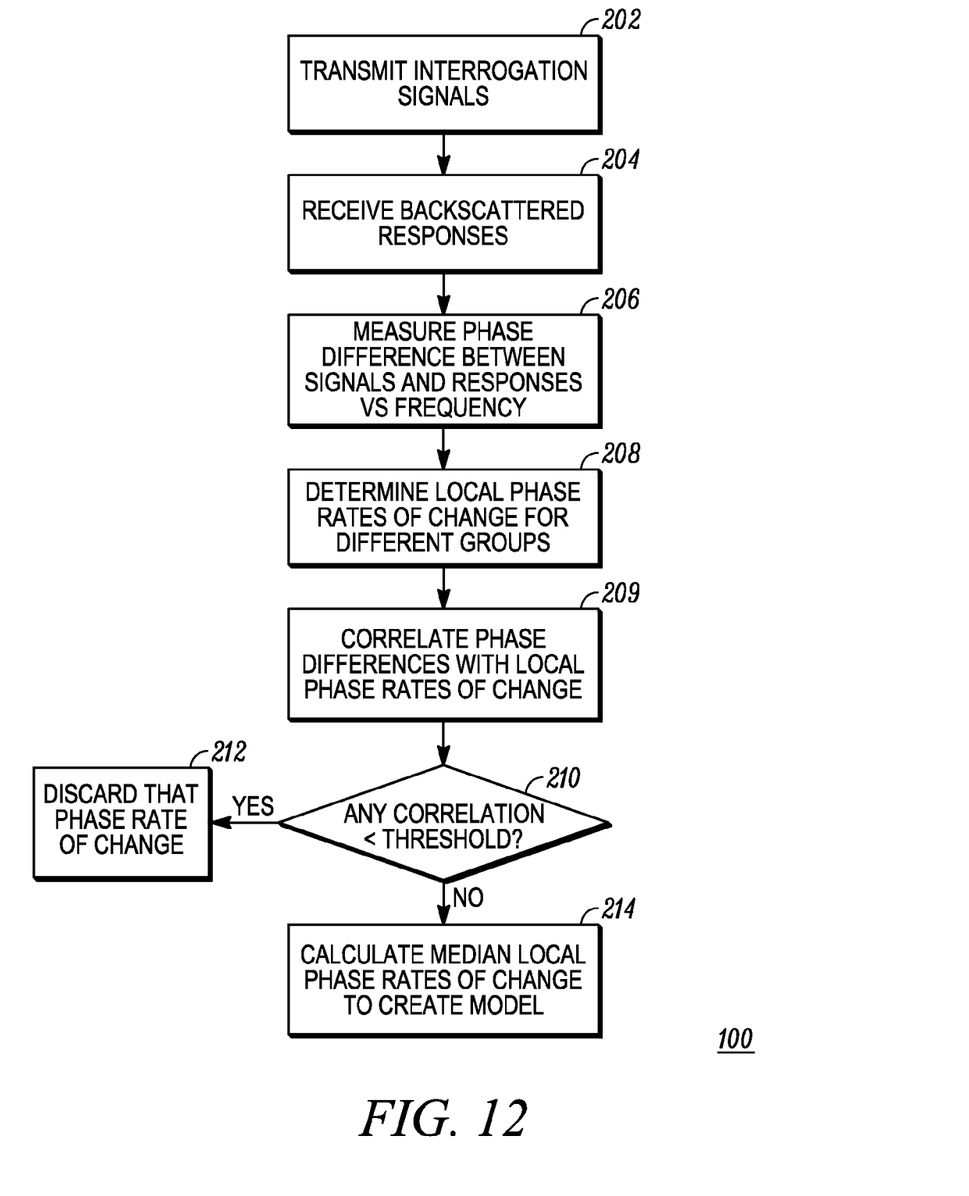
FIG. 12 is an extension of the flowchart of FIG. 11, in accordance with one embodiment of the present invention.

Referring to FIG. 12, one technique for establishing 100 the model includes making phase difference/frequency measurements at different frequencies and use these measurement points are used to derive the model. In particular, this technique includes the substep of transmitting 202 a plurality of interrogation signals at different hop frequencies to the RFID tag, and receiving 204 respective backscatter modulated responses from the RFID tag. The processor measures 206 a phase difference between each of the interrogation signals and the respective backscatter modulated responses versus frequency, and determines 208 a plurality of local phase rates-of-change of the phase differences for different groups of neighboring frequencies (as shown in FIG. 8).

This technique then provides 209 a correlation of the measured phase differences for each group of neighboring frequencies with each respective local phase rate-of-change, such as using a Pearson correlation technique, as is known in the art, or any other suitable linear correlation technique. It is known that the slope of each local group should be within a suitable threshold. If the correlation is poor 210 (i.e. worse than the threshold), those local phase rates-of-change are discarded 212. A correlation being higher than the threshold 210 signifies that the phase differences are substantially linear along the local phase rates-of-change and the local phase rates-of-change should be included towards calculating 214 an average or median rate-of-change of the local phase rates-of-change and an intercept point to create the phase difference/frequency model (such as that of FIG. 5). The intercept point for the model is chosen as before, to compensate for the inherent frequency lag due to cross-correlation sliding dot product processing in the frequency domain.

Figure 13:
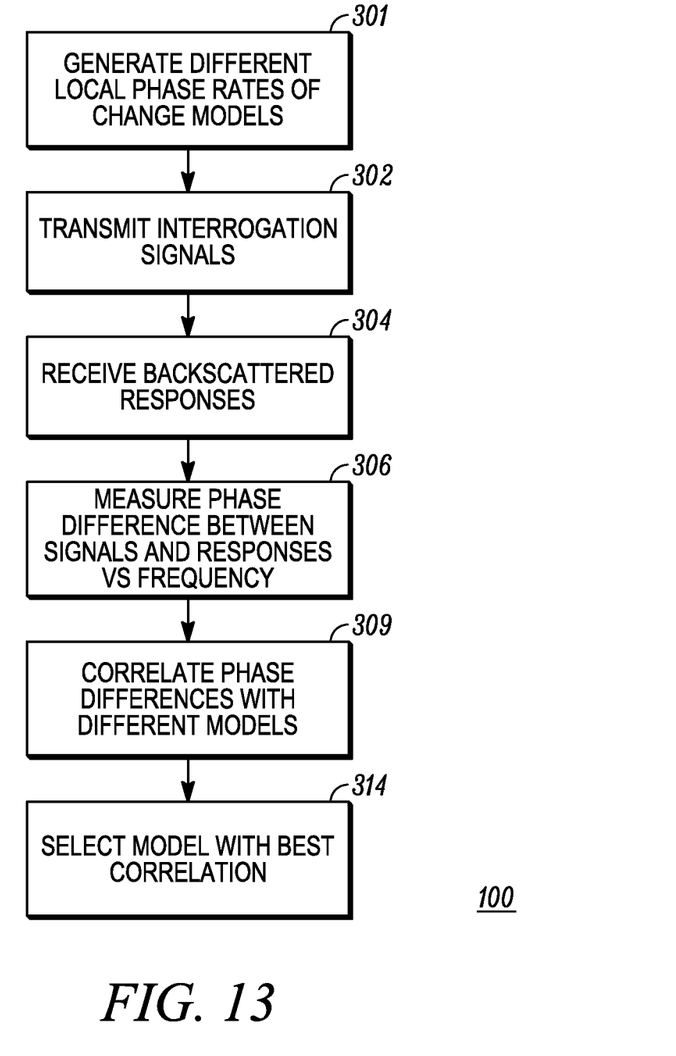
FIG. 13 is an extension of the flowchart of FIG. 11, in accordance with another embodiment of the present invention.

Referring to FIG. 13, another technique to establish 100 the initial phase difference/frequency model includes generating 301 a plurality of different sets of phase-wrapped local phase rates-of-change, each set using a different phase rates-of-change (as shown in FIG. 9). Each of the three models shown has a different local phase rates-of-change (i.e. slope). Although three models are shown any number of models could be used. This technique can then transmits 302 a plurality of interrogation signals at different hop frequencies to the RFID tag, and receives 304 respective backscatter modulated responses from the RFID tag. This technique continues by measuring 306 a phase difference between each of the interrogation signals and the respective backscatter modulated responses versus frequency to obtain the measurement. The same set of measurements is then correlated to each of the models (as shown in FIG. 10) by performing 309 a correlation of the measured phase differences versus frequencies with each of the different sets of phase rates-of-change in the frequency domain. The correlation including dragging the intercept point of each set to slopes to provide a best correlation, thereby accommodating frequency lag of correlation processing in the frequency domain. The method then selects 314 the set of local phase rates-of-change and intercept point that has the best correlation as the phase difference/frequency model.

In the present invention, several different procedures can be used in selecting the frequencies of the plurality of transmitted signals. One significant factor is the regulatory constraints imposed on the system. For example, in some regulatory systems it will be desirable to base frequency selection on channel availability. In another example, frequency selection can be randomly selected.

Specifically, in certain bands such as 915 MHz and 2.45 MHz Industrial, Scientific and Medical (ISM) bands, the FCC and other regulatory agencies allow up to four watts of transmitted power if suitable spread spectrum techniques are employed. The movement detection system can be implemented to randomly select transmission frequencies (i.e., channels) within one or more frequency bands and thus meet the requirements of a spread spectrum system. By randomly selecting frequencies and otherwise complying with the regulatory framework, the movement detection system can thus transmit to the higher power level allowed such systems.

Transmitting at higher power levels increases the effective range of the system and thus the overall performance of the system.

As another example, other regulatory bodies such as CEPT in Europe specify the use of "listen before transmit" procedures instead of random hopping used in spread spectrum. In such a system, the transmitter listens for transmissions at a frequency channel before making its own transmission in that channel. If the transmitter detects activity in that channel, the transmitter will switch to the next frequency channel. There it will again listen to detect other transmissions before transmitting itself. This process is continued until an available channel is found and the transmission is made in that available channel. A variety of different channel selection algorithms are available to implement such a system based on sensing channel occupation or the traditional carrier sense multiple access (CSMA) methods. In any event, the movement detection system can select transmission frequencies using the "listen before transmit" procedure in such a way that it is most compatible with the regulatory framework for which the system is designed to operate. Without the ability to use such a channel selection algorithm the movement detection system would be limited in the power that can be used in transmitting to the RFID tag, resulting in less range and accuracy for the system.

Advantageously, the present invention can detection tag/object motion without calculating range, location or distance. This is important because range estimates based on $\delta\phi/\delta f$ are inaccurate in a multipath environment. Also, no phase unwrapping is required in the present invention. This is important because phase unwrapping is problematic when $\delta\phi/\delta f$ changes across the spectrum, and the present invention can accommodate local $\delta\phi/\delta f$ changes. The present invention can also use a single antenna. This is important because, any other antennas of the RFID reader can be spaced further apart when motion can be detected in the present invention by using just a single antenna (less overlap required). The present invention can distinguish when a tag starts to move with small amounts of data, even if movement occurs between reads of the tag (some tags may be read rarely: when hidden at the back of a shelf or because they are only occasionally selected). The detection of movement can then be used to: preferentially select moving tags over stationary tags to capture more data from business relevant events, distinguish which tags are moving at any time (for example to link with a video footage based on timestamp), and modify confidence factors associated with different location algorithms.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for determining movement of a Radio Frequency Identification (RFID) tag, the system comprising:
a processor operable to establish a wrapped phase difference/frequency model comprising a set of local rates-of-change and an intercept point; and
an RFID reader operable to periodically transmit at least one interrogation signal to an RFID tag using at least one respective frequency and receive at least one respective backscattered modulated response from the RFID tag at the at least one respective frequency, wherein
the processor is further operable to: measure a phase difference between the at least one signal and the at least one respective response at the at least one respective frequency to determine a measured phase rates-of-change after the wrapped phase difference/frequency model is established, determine a correlation of (1) the measured phase rates-of-change at the at least one respective frequency after the wrapped phase difference/frequency model is established to (2) a derived phase rates-of-change at least said one respective frequency as determined from the wrapped phase difference/frequency model, said correlation is proportional to the covariance of said measured phase rates-of-change and said derived phase rates-of-change sampled over a group of neighboring frequencies, wherein
if the correlation is greater than or equal to a predetermined limit, the processor sends an indication to a server that the tag is stationary, and
if the correlation is less than the predetermined limit, the processor sends an indication to a server that the tag is moving.

2. The system of claim 1, wherein the model is established by:
the RFID reader transmitting a plurality of interrogation signals at different hop frequencies to an RFID tag and receiving respective backscatter modulated responses from the RFID tag; and
the processor: measuring a phase difference between each of the interrogation signals and the respective backscatter modulated responses versus frequency, determining a plurality of local phase rates-of-change of the phase differences for different groups of neighboring frequencies, providing a correlation of the measured phase differences for each group of neighboring frequencies with each respective local phase rate-of-change, discarding those local phase rates-of-change where the correlation is worse than a threshold, calculate a median phase rate-of-change of the local phase rates-of-change and an intercept point, and creating the phase difference/frequency model of a set of phase-wrapped median phase rates-of-change and intercept point.

3. The system of claim 1, wherein the model is established by:
the processor generating a plurality of different sets of phase-wrapped local phase rates-of-change, each set using a different phase rates-of-change;
the RFID reader transmitting a plurality of interrogation signals at different hop frequencies to an RFID tag and receiving respective backscatter modulated responses from the RFID tag; and
the processor: measuring a phase difference between each of the interrogation signals and the respective backscatter modulated responses versus frequency, providing a cross-correlation of the measured phase differences versus frequencies with each of the different sets of phase rates-of-change, the cross-correlation including dragging the intercept point of each set to provide a best correlation, and selecting the set of local phase rates-of-change and intercept point having the best cross-correlation as the wrapped phase difference/frequency model.

4. The system of claim 1, wherein the processor is further operable to store phase differences for particular frequencies for an indicated stationary tag to create a history, and use the history to modify the model.

5. The system of claim 4, wherein if a tag is indicated as moving, discarding the history for that tag.

6. The system of claim 1, wherein if a tag is indicated as moving, the RFID reader reduces a period of the interrogation transmissions, and if a tag is indicated as stationary the RFID reader increases the period of the interrogation transmissions.

7. The system of claim 1, wherein if the correlation is greater than the predetermined limit reading the tag for at least one more measurement to determine if the at least one more correlation is greater than the error limit, confirming that the tag is moving.

8. A method in an apparatus for determining movement of a Radio Frequency Identification (RFID) tag, the method comprising the steps of:
establishing a wrapped phase difference/frequency model comprising a set of phase-wrapped local phase rates-of-change and an intercept point; and
periodically transmitting, by an RFID reader, at least one interrogation signal to an RFID tag using at least one respective frequency;
receiving at least one respective backscattered modulated response from the RFID tag at the at least one respective frequency;
measuring a phase difference between the at least one signal and the at least one respective response at the at least one respective frequency to determine a measured phase rates-of-change after the wrapped phase difference/frequency model is established;
determining a correlation of (1) the measured phase rates-of-change at the at least one respective frequency after the wrapped phase difference/frequency model is established to (2) a derived phase rates-of-change at least said one respective frequency as determined from the wrapped phase difference/frequency model, said correlation is proportional to the covariance of said measured phase rates-of-change and said derived phase rates-of-change sampled over a group of neighboring frequencies, wherein
if the correlation is greater than or equal to a predetermined limit, sending an indication that the tag is stationary, and
if the correlation is less than the predetermined limit, sending an indication that the tag is moving.

9. The method of claim 8, wherein the establishment step includes:
a RFID reader transmitting a plurality of interrogation signals at different hop frequencies to an RFID tag and receiving respective backscatter modulated responses from the RFID tag; and a processor: measuring a phase difference between each of the interrogation signals and the respective backscatter modulated responses versus frequency, determining a plurality of local phase rates-of-change of the phase differences for different groups of neighboring frequencies, providing a correlation of the measured phase differences for each group of neighboring frequencies with each respective local phase rate-of-change, discarding those local phase rates-of-change where the correlation is worse than a threshold, calculate a median phase rate-of-change of the local phase rates-of-changes and an intercept point, and creating the phase difference/frequency model of a set of phase-wrapped median phase rates-of-change and intercept point.

10. The method of claim 8, wherein the establishment step includes:
   generating a plurality of different sets of phase-wrapped local phase rates-of-change, each set using a different rate-of-change;
   a RFID reader transmitting a plurality of interrogation signals at different hop frequencies to an RFID tag and receiving respective backscatter modulated responses from the RFID tag; and
   a processor: measuring a phase difference between each of the interrogation signals and the respective backscatter modulated responses versus frequency, providing a cross-correlation of the measured phase differences versus frequencies with each of the different sets of phase rates-of-change, the cross-correlation including dragging the intercept point of each set to provide a best correlation, and selecting the set of local phase rates-of-change and intercept point having the best cross-correlation as the wrapped phase difference/frequency model.

11. The method of claim 8, further comprising storing phase differences for particular frequencies for an indicated stationary tag to create a history, and use the history for modifying the model.

12. The method of claim 11, wherein if a tag is indicated as moving, discarding the history for that tag.

13. The method of claim 8, wherein if a tag is indicated as moving, reducing a period of the interrogation transmissions, and if a tag is indicated as stationary the increasing the period of the interrogation transmissions.

14. The method of claim 8, wherein if the correlation is worse than the predetermined limit reading the tag for at least one more measurement to determine if the at least one more correlation is worse than the error limit, confirming that the tag is moving.

* * * * *